United States Patent
Sugata

(10) Patent No.: US 11,943,574 B2
(45) Date of Patent: Mar. 26, 2024

(54) INFORMATION PROCESSING SYSTEM, INFORMATION PROCESSING METHOD, AND NON-TRANSITORY COMPUTER READABLE MEDIUM STORING PROGRAM

(71) Applicant: TOYOTA JIDOSHA KABUSHIKI KAISHA, Toyota Aichi-ken (JP)

(72) Inventor: Hikaru Sugata, Miyoshi Aichi-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 248 days.

(21) Appl. No.: 17/517,146

(22) Filed: Nov. 2, 2021

(65) Prior Publication Data

US 2022/0141556 A1 May 5, 2022

(30) Foreign Application Priority Data

Nov. 4, 2020 (JP) .................................. 2020-184384

(51) Int. Cl.
*H04Q 9/04* (2006.01)
*H04L 7/00* (2006.01)

(52) U.S. Cl.
CPC ............. *H04Q 9/04* (2013.01); *H04L 7/0016* (2013.01); *H04L 7/0029* (2013.01); *H04Q 2209/10* (2013.01); *H04Q 2209/40* (2013.01)

(58) Field of Classification Search
CPC .. H04Q 9/04; H04Q 2209/10; H04Q 2209/40; H04L 7/0016; H04L 7/0029
See application file for complete search history.

(56) References Cited

U.S. PATENT DOCUMENTS

| | | | |
|---|---|---|---|
| 10,397,355 B2* | 8/2019 | Hajj | H04L 67/12 |
| 11,170,295 B1* | 11/2021 | Carmichael | G06N 3/084 |
| 2005/0156580 A1* | 7/2005 | Hashimoto | H03M 1/1028 323/234 |
| 2008/0183525 A1* | 7/2008 | Tsuji | G06Q 10/10 705/7.18 |
| 2011/0314357 A1* | 12/2011 | Kondou | H04L 7/0029 714/775 |

(Continued)

FOREIGN PATENT DOCUMENTS

| | | |
|---|---|---|
| JP | 2008-210363 A | 9/2008 |
| JP | 5160818 B2 | 3/2013 |
| JP | 2018-013460 A | 1/2018 |

*Primary Examiner* — Faisal M Zaman
(74) *Attorney, Agent, or Firm* — Dinsmore & Shohl LLP

(57) ABSTRACT

Each of wearable terminals includes a terminal time correction unit configured to correct terminal time of a terminal clock unit based on time data externally acquired, a terminal data generation unit configured to generate terminal data at a predetermined data generation time interval counted based on an output signal of an oscillation circuit, and a data transmission/reception unit configured to transmit the terminal data to an analysis apparatus. The analysis apparatus includes a terminal data correction unit configured to correct, for each of the wearable terminals, terminal time data of the plurality of pieces of terminal data received from each of the wearable terminals. The terminal data correction unit corrects the terminal time data of the plurality of pieces of terminal data in such a way that intervals between the terminal time data of the plurality of pieces of terminal data become even on the time axis.

8 Claims, 11 Drawing Sheets

(56) References Cited

U.S. PATENT DOCUMENTS

| | | | |
|---|---|---|---|
| 2013/0176068 A1* | 7/2013 | Yamamoto | H03M 3/388 |
| | | | 327/362 |
| 2017/0189756 A1* | 7/2017 | Brothers | G06F 18/22 |
| 2017/0263147 A1* | 9/2017 | King | G11B 27/026 |
| 2017/0286633 A1* | 10/2017 | Ashoori | G16H 40/67 |
| 2018/0027515 A1* | 1/2018 | Tsuji | H04L 47/24 |
| | | | 709/232 |
| 2018/0036591 A1* | 2/2018 | King | H04N 5/76 |
| 2018/0097825 A1* | 4/2018 | Pavlas | G06F 11/0751 |
| 2019/0283247 A1* | 9/2019 | Chang | A61B 5/1121 |

\* cited by examiner

| TERMINAL ID | DATA No. | TERMINAL TIME DATA | SOUND PRESSURE DATA | ACCELERATION DATA |
|---|---|---|---|---|

Fig. 3

| TERMINAL ID | DATA No. | TERMINAL TIME DATA | SOUND PRESSURE DATA | ACCELERATION DATA |
|---|---|---|---|---|
| 71 | 14772 | 143476627.137 | {·········} | {·········} |
| 71 | 14773 | 143476632.137 | {·········} | {·········} |
| 71 | 14774 | 143476637.137 | {·········} | {·········} |
| 71 | 14775 | 143476642.137 | {·········} | {·········} |
| 71 | 14776 | 143476647.137 | {·········} | {·········} |
| 71 | 14777 | 143476652.137 | {·········} | {·········} |
| 71 | 14778 | 143476657.137 | {·········} | {·········} |
| 71 | 14779 | 143476662.307 | {·········} | {·········} |
| 71 | 14780 | 143476667.307 | {·········} | {·········} |
| 71 | 14781 | 143476672.307 | {·········} | {·········} |
| 71 | 14782 | 143476677.307 | {·········} | {·········} |
| 71 | 14783 | 143476682.307 | {·········} | {·········} |
| 71 | 14784 | 143476687.307 | {·········} | {·········} |
| 71 | 14785 | 143476692.307 | {·········} | {·········} |
| 71 | 14787 | 143476702.307 | {·········} | {·········} |
| 71 | 14788 | 143476707.307 | {·········} | {·········} |
| 71 | 14789 | 143476712.307 | {·········} | {·········} |
| 71 | 14790 | 143476717.307 | {·········} | {·········} |
| 71 | 14791 | 143476722.307 | {·········} | {·········} |
| 71 | 14792 | 143476727.277 | {·········} | {·········} |
| 71 | 14793 | 143476732.277 | {·········} | {·········} |
| 71 | 14794 | 143476737.277 | {·········} | {·········} |
| 71 | 14795 | 143476742.277 | {·········} | {·········} |
| 71 | 14796 | 143476846.490 | {·········} | {·········} |
| 71 | 14797 | 143476851.490 | {·········} | {·········} |
| 71 | 14798 | 143476856.490 | {·········} | {·········} |
| 71 | 14799 | 143476861.490 | {·········} | {·········} |
| 71 | 14800 | 143476866.490 | {·········} | {·········} |
| 71 | 14801 | 143476871.490 | {·········} | {·········} |
| 71 | 14802 | 143476876.490 | {·········} | {·········} |

Fig. 5

| TERMINAL ID | DATA No. | TERMINAL TIME DATA | SOUND PRESSURE DATA | ACCELERATION DATA | DIFFERENCE |
|---|---|---|---|---|---|
| 71 | 14772 | 143476627.137 | {·········} | {·········} | - |
| 71 | 14773 | 143476632.137 | {·········} | {·········} | 5.000 |
| 71 | 14774 | 143476637.137 | {·········} | {·········} | 5.000 |
| 71 | 14775 | 143476642.137 | {·········} | {·········} | 5.000 |
| 71 | 14776 | 143476647.137 | {·········} | {·········} | 5.000 |
| 71 | 14777 | 143476652.137 | {·········} | {·········} | 5.000 |
| 71 | 14778 | 143476657.137 | {·········} | {·········} | 5.000 |
| 71 | 14779 | 143476662.307 | {·········} | {·········} | 5.170 |
| 71 | 14780 | 143476667.307 | {·········} | {·········} | 5.000 |
| 71 | 14781 | 143476672.307 | {·········} | {·········} | 5.000 |
| 71 | 14782 | 143476677.307 | {·········} | {·········} | 5.000 |
| 71 | 14783 | 143476682.307 | {·········} | {·········} | 5.000 |
| 71 | 14784 | 143476687.307 | {·········} | {·········} | 5.000 |
| 71 | 14785 | 143476692.307 | {·········} | {·········} | 5.000 |
| 71 | 14787 | 143476702.307 | {·········} | {·········} | 10.000 |
| 71 | 14788 | 143476707.307 | {·········} | {·········} | 5.000 |
| 71 | 14789 | 143476712.307 | {·········} | {·········} | 5.000 |
| 71 | 14790 | 143476717.307 | {·········} | {·········} | 5.000 |
| 71 | 14791 | 143476722.307 | {·········} | {·········} | 5.000 |
| 71 | 14792 | 143476727.277 | {·········} | {·········} | 4.970 |
| 71 | 14793 | 143476732.277 | {·········} | {·········} | 5.000 |
| 71 | 14794 | 143476737.277 | {·········} | {·········} | 5.000 |
| 71 | 14795 | 143476742.277 | {·········} | {·········} | 5.000 |
| 71 | 14796 | 143476846.490 | {·········} | {·········} | 104.213 |
| 71 | 14797 | 143476851.490 | {·········} | {·········} | 5.000 |
| 71 | 14798 | 143476856.490 | {·········} | {·········} | 5.000 |
| 71 | 14799 | 143476861.490 | {·········} | {·········} | 5.000 |
| 71 | 14800 | 143476866.490 | {·········} | {·········} | 5.000 |
| 71 | 14801 | 143476871.490 | {·········} | {·········} | 5.000 |
| 71 | 14802 | 143476876.490 | {·········} | {·········} | 5.000 |

Fig. 8

| TERMINAL ID | DATA No. | TERMINAL TIME DATA | SOUND PRESSURE DATA | ACCELERATION DATA | DIFFE-RENCE | DETECTION ORDER DATA | TERMINAL TIME DATA AFTER CORRECTION | DIFFERENCE |
|---|---|---|---|---|---|---|---|---|
| 71 | 14772 | 1434766627.137 | [·········] | [·········] | - | 1 | 1434766627.163 | - |
| 71 | 14773 | 1434766632.137 | [·········] | [·········] | 5.000 | 2 | 1434766632.170 | 5.008 |
| 71 | 14774 | 1434766637.137 | [·········] | [·········] | 5.000 | 3 | 1434766637.178 | 5.008 |
| 71 | 14775 | 1434766642.137 | [·········] | [·········] | 5.000 | 4 | 1434766642.186 | 5.008 |
| 71 | 14776 | 1434766647.137 | [·········] | [·········] | 5.000 | 5 | 1434766647.193 | 5.008 |
| 71 | 14777 | 1434766652.137 | [·········] | [·········] | 5.000 | 6 | 1434766652.201 | 5.008 |
| 71 | 14778 | 1434766657.137 | [·········] | [·········] | 5.000 | 7 | 1434766657.209 | 5.008 |
| 71 | 14779 | 1434766662.307 | [·········] | [·········] | 5.170 | 8 | 1434766662.216 | 5.008 |
| 71 | 14780 | 1434766667.307 | [·········] | [·········] | 5.000 | 9 | 1434766667.224 | 5.008 |
| 71 | 14781 | 1434766672.307 | [·········] | [·········] | 5.000 | 10 | 1434766672.232 | 5.008 |
| 71 | 14782 | 1434766677.307 | [·········] | [·········] | 5.000 | 11 | 1434766677.239 | 5.008 |
| 71 | 14783 | 1434766682.307 | [·········] | [·········] | 5.000 | 12 | 1434766682.247 | 5.008 |
| 71 | 14784 | 1434766687.307 | [·········] | [·········] | 5.000 | 13 | 1434766687.255 | 5.008 |
| 71 | 14785 | 1434766692.307 | [·········] | [·········] | 5.000 | 14 | 1434766692.262 | 5.008 |
| 71 | 14787 | 1434766702.307 | [·········] | [·········] | 10.000 | 16 | 1434766702.278 | 10.015 |
| 71 | 14788 | 1434766707.307 | [·········] | [·········] | 5.000 | 17 | 1434766707.285 | 5.008 |
| 71 | 14789 | 1434766712.307 | [·········] | [·········] | 5.000 | 18 | 1434766712.293 | 5.008 |
| 71 | 14790 | 1434766717.307 | [·········] | [·········] | 5.000 | 19 | 1434766717.301 | 5.008 |
| 71 | 14791 | 1434766722.307 | [·········] | [·········] | 5.000 | 20 | 1434766722.308 | 5.008 |
| 71 | 14792 | 1434766727.277 | [·········] | [·········] | 4.970 | 21 | 1434766727.316 | 5.008 |
| 71 | 14793 | 1434766732.277 | [·········] | [·········] | 5.000 | 22 | 1434766732.324 | 5.008 |
| 71 | 14794 | 1434766737.277 | [·········] | [·········] | 5.000 | 23 | 1434766737.331 | 5.008 |
| 71 | 14795 | 1434766742.277 | [·········] | [·········] | 5.000 | 24 | 1434766742.339 | 5.008 |

Fig. 9

INFORMATION PROCESSING SYSTEM, INFORMATION PROCESSING METHOD, AND NON-TRANSITORY COMPUTER READABLE MEDIUM STORING PROGRAM

CROSS REFERENCE TO RELATED APPLICATIONS

This application is based upon and claims the benefit of priority from Japanese patent application No. 2020-184384, filed on Nov. 4, 2020, the disclosure of which is incorporated herein in its entirety by reference.

BACKGROUND

The present disclosure relates to an information processing system, an information processing method, and a program.

Patent Literature 1 (Japanese Patent No. 5160818) discloses a sensor network system including a nametag-type terminal worn on the body of each participant in a communication, a terminal management apparatus that communicates with a plurality of terminals, and a data processing apparatus. Each terminal constantly detects speeches and actions of the participant wearing the terminal, obtains the detection time from an internal clock of the terminal, and transmits terminal data including the results of the detection and the detection time to the terminal management apparatus at predetermined time intervals. The detection time corresponds to the first result of a plurality of results of the detection included in one piece of terminal data. The data processing apparatus calculates a value indicating the relation between the participants wearing the respective terminals based on the terminal data transmitted from the plurality of terminals. Each terminal then corrects the time of its internal clock through communication with the terminal management apparatus in such a way that the time indicated by the internal clock of the terminal matches the time indicated by the internal clock of the terminal management apparatus.

SUMMARY

In the aforementioned sensor network system, whether or not the timings of the occurrence of the speeches and actions of the plurality of participants coincide with each other can be an important indicator. It is therefore required that the respective times of the internal clocks of the plurality of terminals (hereinafter, each of these times will be referred to as a terminal time and each of these clocks will be referred to as a terminal clock) be completely synchronized with each other.

It is not practical, however, to completely synchronize the terminal times of a plurality of terminals. This is because each of the terminal times is regularly corrected based on the time data received from the terminal management apparatus, and each terminal time cannot be completely synchronized with the time of the internal clock of the terminal management apparatus (hereinafter, this time will be referred to as apparatus time and this clock will be referred to as an apparatus clock) due to a communication delay that accidentally occurs. Therefore, when the amount of communication delay is relatively large, each of the terminal times is far behind the apparatus time, and when the amount of communication delay is relatively small, each of the terminal times is slightly behind the apparatus time, as a result of which the respective terminal times of the plurality of terminals never coincide with each other.

The aim of the present disclosure is to provide a technique for analyzing terminal data received from a plurality of sensor terminals on the same time axis.

According to a first aspect of the present disclosure, an information processing system including a plurality of sensor terminals worn by a plurality of respective participants who participate in one communication and an information processing apparatus capable of communicating with the plurality of sensor terminals, in which each of the sensor terminals includes: a sensor configured to output sensing data regarding a participant who wears the sensor terminal; a terminal clock unit; a terminal time correction unit configured to correct a terminal time of the terminal clock unit based on time data externally acquired; an oscillation circuit, a terminal data generation unit configured to acquire the sensing data output from the sensor and terminal time data output from the terminal clock unit at a predetermined generation time interval counted based on an output signal of the oscillation circuit, and generate terminal data including the sensing data and the terminal time data; and a data transmission unit configured to transmit the terminal data to the information processing apparatus, the information processing apparatus includes: a terminal data storage unit configured to store a plurality of pieces of terminal data received from each of the sensor terminals; and a terminal data correction unit configured to correct, for each sensor terminal, the terminal time data of the plurality of pieces of terminal data, and the terminal data correction unit corrects the terminal time data of the plurality of pieces of terminal data in such a way that the intervals between the terminal time data of the plurality of pieces of terminal data become even on the time axis is provided. According to the above configuration, the deviation of the terminal time between the plurality of sensor terminals, which is due to the communication delay at the time of correction by the terminal time correction unit, is eliminated, whereby it becomes possible to analyze the terminal data received from the plurality of sensor terminals on the same time axis.

The terminal data correction unit may add detection order data that is increased or decreased by a predetermined increase/decrease value in the order of the detection to the plurality of pieces of terminal data, obtain a linear regression equation between the terminal time data and the corresponding detection order data, and change the terminal time data to a value obtained by substituting the corresponding detection order data into the linear regression equation.

The terminal data correction unit may divide, when the difference between the terminal time data of one piece of terminal data and the terminal time data of another piece of terminal data, these two pieces of terminal data being adjacent to each other in the order of detection, is equal to or larger than a first value, the plurality of pieces of terminal data into two groups at a border between the two pieces of terminal data; and correct, for each of the groups, the terminal time data of the plurality of pieces of terminal data. That is, when the sensor terminal has temporarily stopped transmission of the terminal data, the difference between the terminal time data of two pieces of terminal data before and after the stop becomes large, which ends up being noise for the above linear regression equation. According to the above configuration, the plurality of pieces of terminal data are divided into groups before and after the stop and correction is executed for each group, whereby it becomes possible to eliminate the influence of the above noise.

The terminal data correction unit may set, when the difference between the terminal time data of one piece of terminal data and the terminal time data of another piece of terminal data, these two pieces of terminal data being adjacent to each other in the order of detection, is longer than the generation time interval and is equal to or smaller than a second value, as the detection order data to be added to terminal data that comes later in the order of the detection, a value obtained by adding a value obtained by multiplying a value obtained by dividing the difference by the generation time interval by the predetermined increase/decrease value to the detection order data added to terminal data that comes first in the order of the detection. That is, when one of the plurality of pieces of terminal data is missing, the difference between the terminal time data of one piece of terminal data and the terminal time data of another piece of terminal data, these two pieces of terminal data being those before and after the missing terminal data, becomes larger than the difference between the terminal time data of one piece of terminal data and the terminal time data of another piece of terminal data, these two pieces of terminal data being those prior to the missing. When, for example, one piece of terminal data is missing, the difference between the terminal time data of one piece of terminal data and the terminal time data of another piece of terminal data, these two pieces of terminal data being those before and after the missing terminal data, becomes twice as large as the generation time interval. According to the above configuration, the regression coefficients of the linear regression equation do not change due to the presence of the above missing.

According to a second aspect of the present disclosure, an information processing method of an information processing system including a plurality of sensor terminals worn by a plurality of respective participants who participate in one communication and an information processing apparatus capable of communicating with the plurality of sensor terminals, in which each of the sensor terminals includes: a sensor configured to output sensing data regarding a participant who wears the sensor terminal; a terminal clock unit; and an oscillation circuit, each of the sensor terminals corrects a terminal time of the terminal clock unit based on time data externally acquired, each of the sensor terminals acquires the sensing data output from the sensor and terminal time data output from the terminal clock unit at a predetermined generation time interval counted based on an output signal of the oscillation circuit, and generates terminal data including the sensing data and the terminal time data, each of the sensor terminals transmits the terminal data to the information processing apparatus, the information processing apparatus stores a plurality of pieces of terminal data received from each of the sensor terminals, the information processing apparatus corrects, for each of the sensor terminals, the terminal time data of the plurality of pieces of terminal data, and correcting the terminal time data of the plurality of pieces of terminal data includes correcting the terminal time data of the plurality of pieces of terminal data in such a way that the intervals between the terminal time data of the plurality of pieces of terminal data become even on the time axis is provided. According to the aforementioned method, the deviation of the terminal time between the plurality of sensor terminals, which is due to the communication delay at the time of correction by the terminal time correction unit, is eliminated, whereby it becomes possible to analyze the terminal data received from the plurality of sensor terminals on the same time axis.

Further, a program for causing a computer to execute the above-described information processing method is provided.

According to the present disclosure, the deviation of the terminal time between the plurality of sensor terminals, which is due to the communication delay at the time of correction by the terminal time correction unit, is eliminated, whereby it becomes possible to analyze the terminal data received from the plurality of sensor terminals on the same time axis.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 3 is a diagram showing a data structure of terminal data;

FIG. 5 is a table showing a plurality of pieces of terminal data received from a wearable terminal whose terminal ID is 71;

FIG. 8 is a table showing a plurality of pieces of terminal data and a difference between two pieces of terminal time data that are adjacent to each other in an order of detection;

FIG. 9 is a table for describing correction of terminal time data performed by an analysis apparatus;

DESCRIPTION OF EMBODIMENTS

The present disclosure will be described hereinafter through embodiments according to the present disclosure. However, the present disclosure set forth in the claims are not limited to the following embodiments. Further, not all of the components described in the embodiments are necessarily indispensable for solving the problem. For clarifying the explanations, the following descriptions and the drawings are partially omitted and simplified as appropriate. The same reference symbols are assigned to the same elements throughout the drawings, and redundant descriptions thereof are omitted as appropriate.

Figure 1:
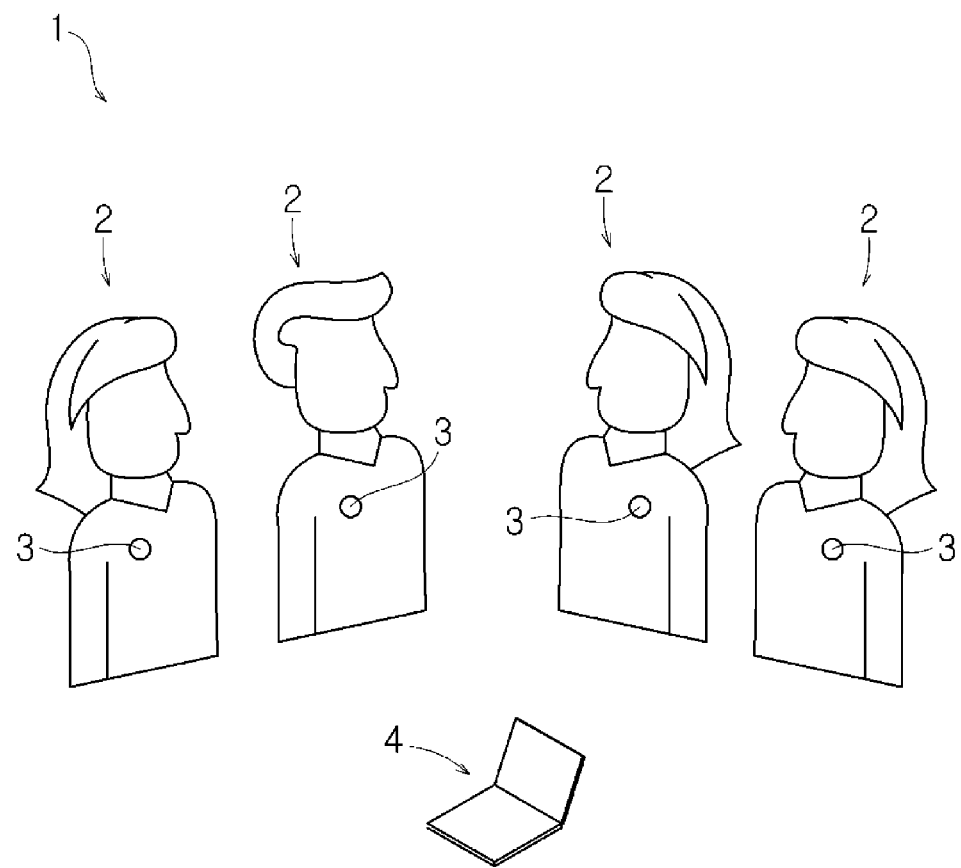
FIG. 1 is a schematic view of a communication analysis system.

FIG. 1 shows a schematic view of a communication analysis system 1. The communication analysis system 1 is one specific example of an information processing system. The communication analysis system 1 is a system for collecting and analyzing big data regarding communication among a plurality of participants 2 and creating new values. For example, the communication analysis system 1 obtains, for each speech, an evaluation value for this speech in communication among the plurality of participants 2. The communication analysis system 1 includes a plurality of wearable terminals 3 and an analysis apparatus 4.

While the number of participants 2 who participate in one communication is four in FIG. 1, this is merely one example. The number of participants who participate in one communication may be two, four or more, or ten or hundred, for example. The communication is typically conversational communication that is established by speeches made by the participants thereof. Examples of this type of communication include a debate, a round-table discussion, and a workshop (or seminar) meeting. However, the communication is not limited to those in which all participants meet in the same real space. That is, the communication may also include those in which all participants meet in an online virtual space.

(Wearable terminal 3)

Each wearable terminal 3 is one specific example of a sensor terminal. As shown in FIG. 1, the plurality of wearable terminals 3 are worn by and used by a plurality of respective participants 2. That is, one participant 2 wears one wearable terminal 3. In this example embodiment, each of the wearable terminals 3 is a badge that can be attached to or detached from a top worn on the upper body of a respective one of the participants 2, and may be attached to a place above the pit of the stomach of the participant 2. The wearable terminal 3 may instead be a headset, an earphone, glasses, a necklace, a pendant or the like in place of being the badge.

Figure 2:
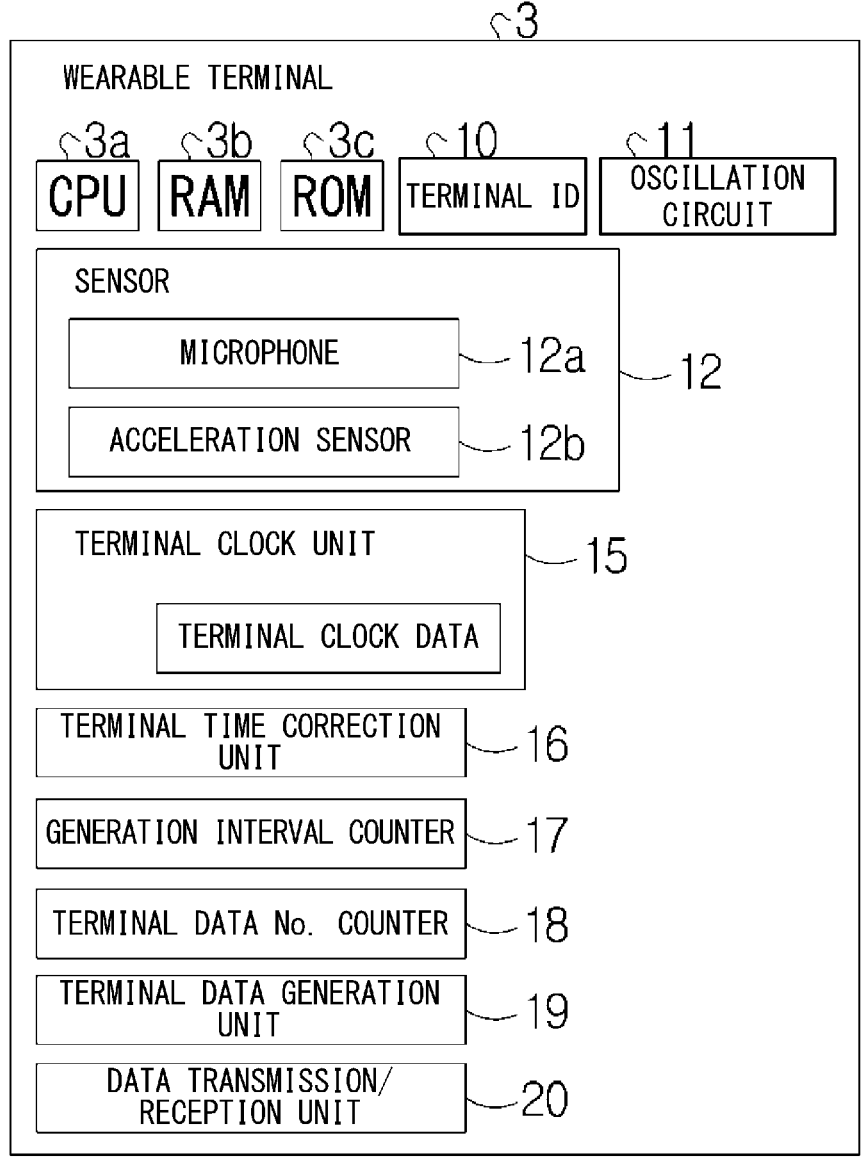
FIG. 2 is a functional block diagram of a wearable terminal.

FIG. 2 shows a functional block diagram of each of the wearable terminals 3. As shown in FIG. 2, the wearable terminal 3 includes a CPU (Central Processing Unit) 3a, a readable/writable RAM (Random Access Memory) 3b, and a read-only ROM (Read Only Memory) 3c. The wearable terminal 3 further includes a terminal ID information storage unit 10, an oscillation circuit 11, and a sensor 12. Then, the CPU 3a loads a control program stored in the ROM 3c and executes the loaded control program, whereby the control program causes hardware such as the CPU 3a to function as a terminal clock unit 15, a terminal time correction unit 16, a generation interval counter 17, a terminal data No. counter 18, a terminal data generation unit 19, and a data transmission/reception unit 20. Each of the wearable terminals 3 can perform two-way radio communication with the analysis apparatus 4 through the data transmission/reception unit 20.

The terminal ID information storage unit 10 stores terminal ID information for identifying a corresponding wearable terminal 3 from other wearable terminals 3. Typically, the terminal ID information may be a MAC address unique to each wearable terminal 3. However, the terminal ID information may be a number or a character set by the analysis apparatus 4 when the wearable terminal 3 is started up, or a combination thereof. In this example embodiment, the terminal ID information is a natural number set by the analysis apparatus 4 when the wearable terminal 3 is started up.

The oscillation circuit 11 outputs signals with a constant frequency. Typically, the oscillation circuit 11 is an oscillator that outputs signals with a constant frequency by supplying a predetermined voltage.

The sensor 12 outputs sensing data regarding the participant 2 wearing the corresponding wearable terminal 3. In this example embodiment, the sensor 12 includes a microphone 12a and an acceleration sensor 12b.

The microphone 12a, which is one specific example of a sound-collecting unit, converts a sound around the corresponding wearable terminal 3 into a voltage value, and accumulates the voltage value in the RAM 3b as sound pressure data. In this example embodiment, the microphone 12a converts, for every 50 ms, for example, a sound around the corresponding wearable terminal 3 into a voltage value, and accumulates the voltage value in the RAM 3b as the sound pressure data.

The acceleration sensor 12b converts three-axis accelerations of the corresponding wearable terminal 3 into voltage values and accumulates the voltage values in the RAM 3b as acceleration data. When the participant 2 wearing the corresponding wearable terminal 3 shakes his/her head "vertically", the upper body of the participant 2 repeats flexion and extension about the roll axis (an axis parallel to the axis that connects the left and right shoulders). Therefore, in this case, of the output values of the acceleration sensor 12b, the output value that corresponds to the vertical component value fluctuates in such a manner that it repeatedly increases and decreases within a predetermined range. On the other hand, when the participant 2 wearing the corresponding wearable terminal 3 shakes his/her head "horizontally", the upper body of the participant 2 repeats twisting around the yaw axis (an axis parallel to the direction in which the spine extends). Therefore, in this case, of the output values of the acceleration sensor 12b, the output value that corresponds to the horizontal component value fluctuates in such a manner that it repeatedly increases and decreases within a predetermined range. By referring to the acceleration data in this way, it is possible to detect the operation of the participant 2 wearing the corresponding wearable terminal 3. In this example embodiment, the acceleration sensor 12b converts, for each 100 ms, for example, three-axis accelerations of the corresponding wearable terminal 3 into voltage values and accumulates the voltage values in the RAM 3b as the acceleration data.

The sensor 12 may include only one of the microphone 12a and the acceleration sensor 12b instead of including both the microphone 12a and the acceleration sensor 12b. The sensor 12 may be formed of, for example, another sensor such as a body surface temperature measurement sensor.

The terminal clock unit 15 includes terminal time data and updates the terminal time data based on the signal output from the oscillation circuit 11. Therefore, the terminal clock unit 15 may also be referred to as an internal clock unit of the corresponding wearable terminal 3.

The terminal time correction unit 16 regularly corrects the terminal time data of the terminal clock unit 15 based on the time data externally acquired. Typically, the terminal time correction unit 16 corrects the terminal time data of the terminal clock unit 15 based on the time data received from the analysis apparatus 4. Alternatively, the terminal time correction unit 16 may correct the terminal time data of the terminal clock unit 15 based on the latest time data acquired through access to a Network Time Protocol (NTP) via the analysis apparatus 4 and the Internet.

Here, the accuracy of the correction of the terminal time data by the terminal time correction unit 16 will be described. In this example embodiment, each of the wearable terminals 3 and the analysis apparatus 4 can perform two-way communication through radio communication. As is well known, a communication delay accidentally occurs in wireless communications. Therefore, the communication time required from the time when the time data is output from the analysis apparatus 4 to each of the wearable terminals 3 to the time when each of the wearable terminals 3 actually receives the time data is not constant and it exhibits a so-called normal distribution. Therefore, the time data of the terminal clock units 15 of the respective wearable terminals 3 do not coincide with each other.

The generation interval counter 17 and the terminal data No. counter 18 are counters that are necessary for the terminal data generation unit 19 to generate the terminal data.

Referring now to FIG. 3, a configuration of the terminal data 19*a* will be described. As shown in FIG. 3, the terminal data 19*a* includes a "terminal ID" area, a "data No." area, a "terminal time data" area, a "sound pressure data" area, and an "acceleration data" area. The "terminal ID" area stores terminal ID information held by the terminal ID information storage unit 10. The "data No." area stores numbers allocated to a large number of pieces of terminal data generated by the terminal data generation unit 19, the numbers identifying each of the pieces of terminal data from other terminals. However, the "data No." area may be omitted. The "terminal time data" area stores the terminal time data held by the terminal clock unit 15. The "sound pressure data" area stores the sound pressure data output from the microphone 12*a*. The "acceleration data" area stores the acceleration data output from the acceleration sensor 12*b*.

The terminal data generation unit 19 regularly generates the terminal data 19*a*. That is, the terminal data generation unit 19 generates the terminal data 19*a* at a predetermined generation time interval (hereinafter, this will be referred to as a data generation time interval). In this example embodiment, the data generation time interval is five seconds. Therefore, the "sound pressure data" area of one piece of terminal data 19*a* stores sound pressure data for five seconds, i.e., 100 pieces of sound pressure data. Likewise, the acceleration data for five seconds, i.e., 50 pieces of acceleration data, are stored in the "acceleration data" area of one piece of terminal data 19*a*.

Typically, the terminal time data stored in the above "terminal time data" area is the terminal time data that corresponds to the timing when the earliest (oldest) sound pressure data among 100 pieces of sound pressure data included in the corresponding terminal data 19*a* has been detected.

The generation interval counter 17 counts the time defined as the data generation time interval based on the signal output from the oscillation circuit 11. Note that the generation interval counter 17 does not count the time defined as the data generation time interval based on the terminal time data of the terminal clock unit 15.

The terminal data No. counter 18 includes a terminal data No. and increments the terminal data No. every time the terminal data generation unit 19 generates the terminal data 19*a*.

The data transmission/reception unit 20 transmits the terminal data 19*a* generated by the terminal data generation unit 19 to the analysis apparatus 4. In this example embodiment, the data transmission/reception unit 20 transmits the terminal data 19*a* to the analysis apparatus 4 through short-range radio communication such as Bluetooth (Registered Trademark). Alternatively, the data transmission/reception unit 20 may transmit the terminal data 19*a* to the analysis apparatus 4 through wired communication. Further, the data transmission/reception unit 20 may transmit the terminal data 19*a* to the analysis apparatus 4 through a network such as the Internet. In this case, the analysis apparatus 4 may be typically constructed on a cloud system.

(Analysis Apparatus 4)

Figure 4:
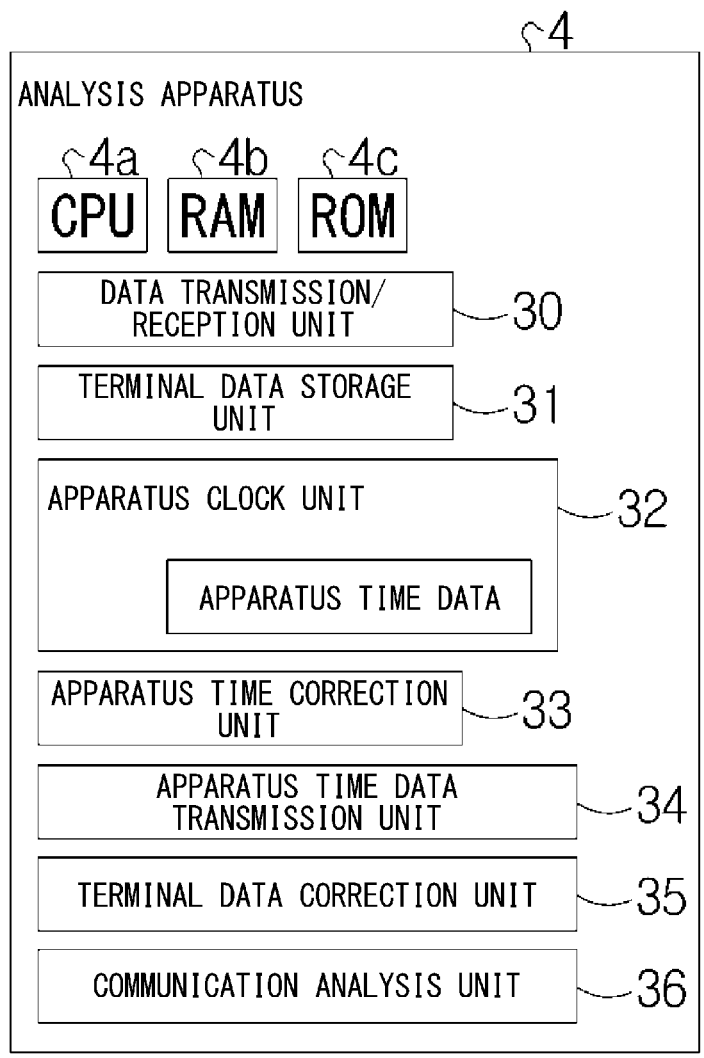
FIG. 4 is a functional block diagram of an analysis apparatus.

FIG. 4 shows a functional block diagram of the analysis apparatus 4. As shown in FIG. 4, the analysis apparatus 4 includes a CPU (Central Processing Unit) 4*a*, a readable/writable RAM (Random Access Memory) 4*b*, and a read-only ROM (Read Only Memory) 4*c*. Then, the CPU 4*a* loads a control program stored in the ROM 4*c* and executes the loaded control program, whereby the control program causes hardware such as the CPU 4*a* to function as a data transmission/reception unit 30, a terminal data storage unit 31, an apparatus clock unit 32, an apparatus time correction unit 33, an apparatus time data transmission unit 34, a terminal data correction unit 35, and a communication analysis unit 36.

The data transmission/reception unit 30 receives the terminal data 19*a* from each of the wearable terminals 3, and stores and accumulates the received terminal data 19*a* in the terminal data storage unit 31. FIG. 5 shows the plurality of pieces of terminal data 19*a* accumulated in the terminal data storage unit 31. As shown in FIG. 5, the terminal data 19*a* received from each of the wearable terminals 3 is accumulated in the terminal data storage unit 31 in the order of the reception. Since the terminal data 19*a* received from the plurality of wearable terminals 3 are accumulated in the terminal data storage unit 31, the terminal data 19*a* including various terminal IDs are accumulated in the terminal data storage unit 31. FIG. 5 only shows the terminal data 19*a* that corresponds to the wearable terminal 3 whose terminal ID is 71, and the other pieces of terminal data 19*a* that are actually present are not shown in FIG. 5.

The apparatus clock unit 32 includes apparatus time data and updates apparatus time data based on a signal output from an oscillation circuit (not shown). Therefore, the apparatus clock unit 32 may also be referred to as an internal clock unit of the analysis apparatus 4.

The apparatus time correction unit 33 regularly corrects the apparatus time data of the apparatus clock unit 32 based on the time data externally acquired. Typically, the apparatus time correction unit 33 corrects the apparatus time data of the apparatus clock unit 32 based on the latest time data acquired through access to a Network Time Protocol (NTP) via the Internet.

The apparatus time data transmission unit 34 transmits the apparatus time data to each of the wearable terminals 3 regularly, e.g., every minute.

The terminal data correction unit 35 corrects, for each of the wearable terminals 3, the terminal time data of the plurality of pieces of terminal data 19*a*. Specifically, the terminal data correction unit 35 corrects, for each of the wearable terminals 3, the terminal time data of the plurality of pieces of terminal data 19*a* in such a way that intervals between the terminal time data of the plurality of pieces of terminal data 19*a* become even on the time axis. The details thereof will be described later.

The communication analysis unit 36 analyzes communication based on a plurality of pieces of terminal data 19*a* that are accumulated in the terminal data storage unit 31 and whose terminal time data is corrected by the terminal data correction unit 35, stores the results of the analysis in the RAM 4*b*, or outputs the results of the analysis to a display (not shown).

(Operation of Each Wearable Terminal 3)

Figure 6:
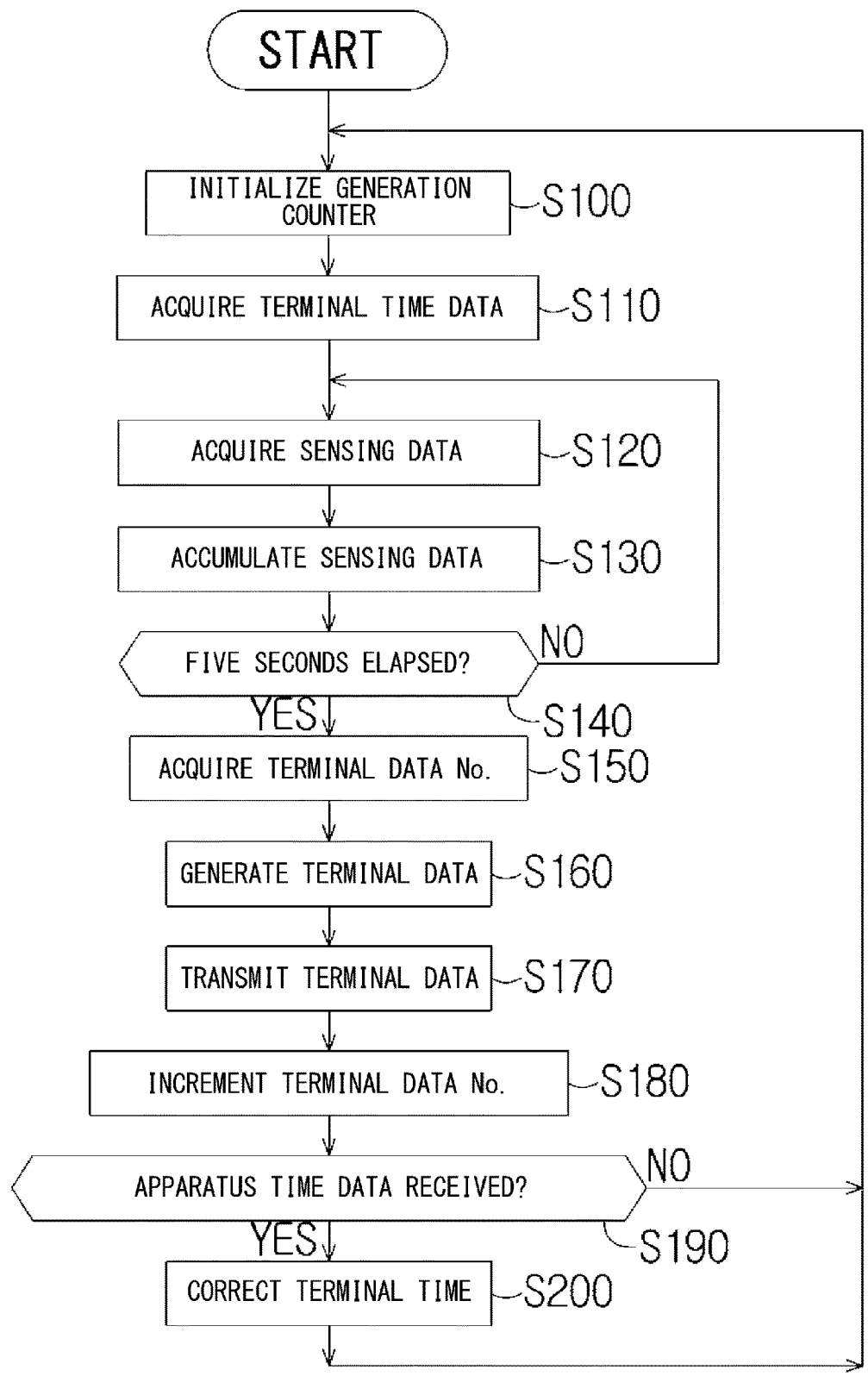
FIG. 6 is a control flow of a wearable terminal.

Referring next to FIG. 6, an operation of each of the wearable terminals 3 will be described. FIG. 6 shows a control flow of each of the wearable terminals 3.

S100:

First, the generation interval counter 17 initializes a count value for counting the time defined as the data generation time interval and starts counting the time defined as the data generation time interval.

S110:

Next, the terminal data generation unit 19 acquires the terminal time data of the terminal clock unit 15.

S120:

Next, the terminal data generation unit 19 acquires the sensing data output from the sensor 12.

S130:

Next, the terminal data generation unit 19 accumulates the acquired sensing data in the RAM 3*b*.

S140:

Next, the terminal data generation unit 19 determines if the time defined as the data generation time interval has elapsed. When the terminal data generation unit 19 has determined that the time defined as the data generation time interval has elapsed, the terminal data generation unit 19 advances the process to S150. On the other hand, when the terminal data generation unit 19 has determined that the time defined as the data generation time interval has not elapsed, the terminal data generation unit 19 returns the process to S120. Accordingly, the RAM 3*b* accumulates the sensing data for five seconds.

S150:

Next, the terminal data generation unit 19 acquires the terminal data No. from the terminal data No. counter 18.

S160:

Next, the terminal data generation unit 19 acquires the terminal ID information from the terminal ID information storage unit 10 and acquires sensing data for five seconds from the RAM 3*b*. Then, as shown in FIG. 3, the terminal data generation unit 19 generates terminal data 19*a* including the terminal ID information, the terminal data No., the terminal time data, and sensing data for five second including the sound pressure data and the acceleration data.

S170:

Referring once again to FIG. 6, the data transmission/reception unit 20 transmits the terminal data 19*a* generated by the terminal data generation unit 19 to the analysis apparatus 4.

S180:

Then the terminal data No. counter 18 increments the terminal data No.

S190:

Further, the terminal time correction unit 16 determines whether or not the time data has been received from the analysis apparatus 4. When the terminal time correction unit 16 determines that the time data has been received from the analysis apparatus 4, the terminal time correction unit 16 advances the process to S200. On the other hand, when the terminal time correction unit 16 determines that the time data has not been received from the analysis apparatus 4, the terminal time correction unit 16 returns the process to S100.

S200:

Then, the terminal time correction unit 16 corrects the terminal time data based on the time data received from the analysis apparatus 4 and returns the process to S100.

(Operation of Analysis Apparatus 4)

Figure 7:
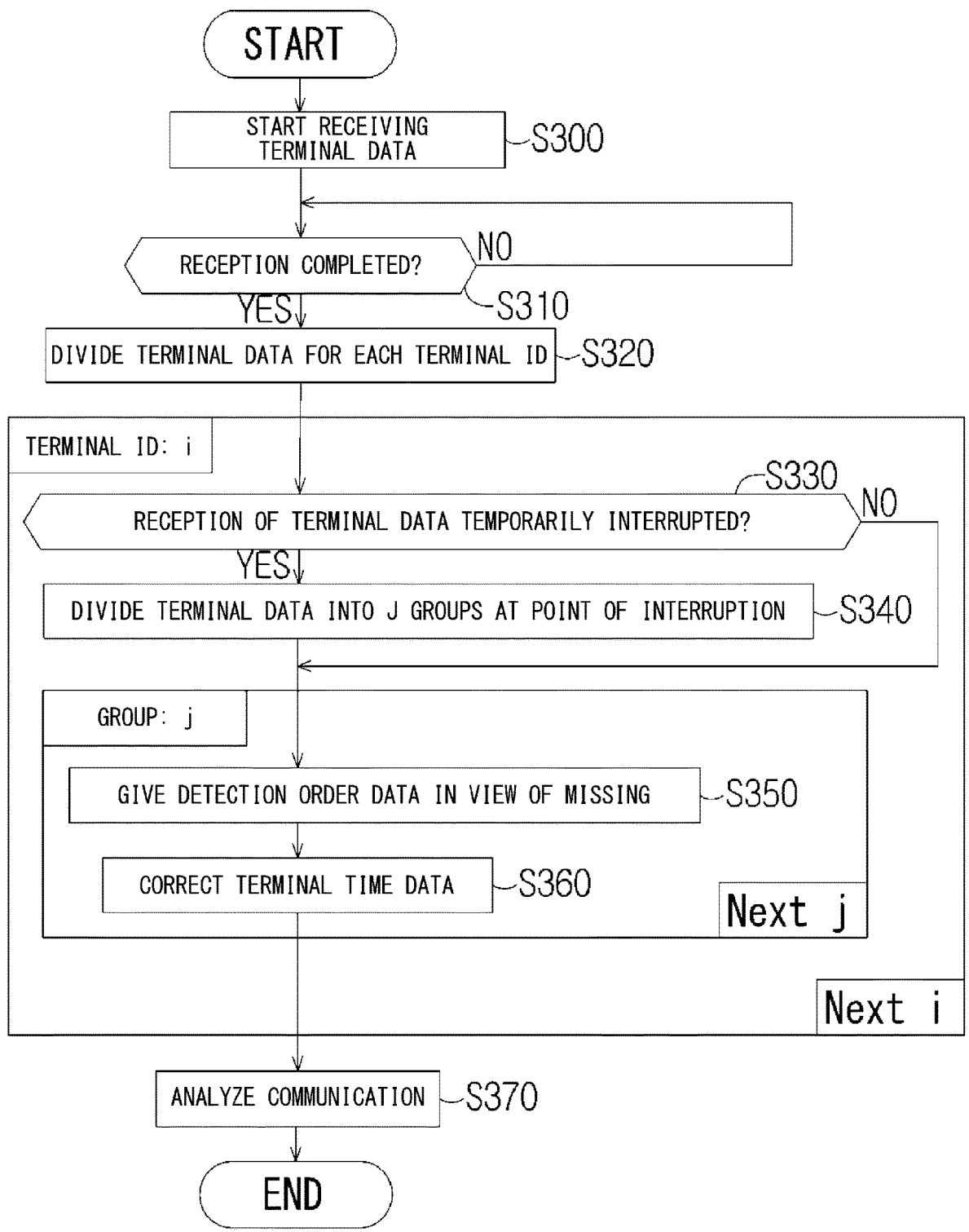
FIG. 7 is a control flow of an analysis apparatus.

Referring next to FIG. 7, an operation of the analysis apparatus 4 will be described. FIG. 7 shows an operation flow of the analysis apparatus 4.

S300:

First, the data transmission/reception unit 30 starts receiving the terminal data 19*a* from each of the wearable terminals 3. The data transmission/reception unit 30 accumulates the received terminal data 19*a* in the terminal data storage unit 31.

S310:

Next, the data transmission/reception unit 30 determines whether or not the reception of the terminal data 19*a* from each of the wearable terminals 3 has been completed. When the data transmission/reception unit 30 has determined that the reception of the terminal data 19*a* from each of the wearable terminals 3 has been completed, the data transmission/reception unit 30 advances the process to S320. When the data transmission/reception unit 30 has determined that the reception of the terminal data 19*a* from each of the wearable terminals 3 has not been completed, the data transmission/reception unit 30 repeats the processing of S310.

S320:

Next, the terminal data correction unit 35 divides, for each terminal ID, the plurality of pieces of terminal data 19*a* accumulated in the terminal data storage unit 31 based on the terminal ID information included in each terminal data 19*a*. FIG. 5 illustrates the terminal data 19*a* received from the wearable terminal 3 whose terminal ID is 71.

S330-S360:

The terminal data correction unit 35 separately executes the processing from S330 to S360 for each terminal ID.

S330:

First, the terminal data correction unit 35 determines whether or not the reception of the terminal data 19*a* by the data transmission/reception unit 30 has been temporarily interrupted. When, for example, the power supply of the wearable terminal 3 has been temporarily turned off, the reception of the terminal data 19*a* by the data transmission/reception unit 30 is temporarily interrupted.

Referring is now made to FIG. 8, which is a drawing that has been prepared for the sake of convenience of description and shows the difference between the terminal time data of the terminal data No. (i) and the terminal time data of the terminal data No. (i-1) added to the column of the terminal data 19*a* of the terminal data No. (i). As described above, since the terminal data 19*a* is created for every five seconds, the difference between the terminal time data of one piece of terminal data 19*a* and the terminal time data of another piece of terminal data 19*a*, these two pieces of terminal data 19*a* being adjacent to each other in the order of detection, is exactly five seconds except for a few cases, as shown in FIG. 8.

As shown in FIG. 8, the difference between the terminal time data of the terminal data No. 14795 and the terminal time data of the terminal data No. 14796 is 104.213 seconds, that is, less than two minutes. This suggests that the power supply of the wearable terminal 3 has been temporarily turned off after the terminal data 19*a* of the terminal data No. 14795 is generated but before the terminal data 19*a* of the terminal data No. 14796 is generated. In this case, the terminal data correction unit 35 determines that the reception of the terminal data 19*a* by the data transmission/reception unit 30 has been temporarily interrupted between the terminal data No. 14795 and the terminal data No. 14796, and advances the process to S340. On the other hand, when the reception of the terminal data 19*a* by the data transmission/reception unit 30 has not been temporarily interrupted, the terminal data correction unit 35 advances the process to S350.

Occurrence of a temporary failure in communication between each of the wearable terminals 3 and the analysis apparatus 4 may cause the data transmission/reception unit 30 of the analysis apparatus 4 to fail to receive several pieces of terminal data 19*a* in a very limited manner. In this case, the difference between the terminal time data of one piece of terminal data 19*a* and the terminal time data of another piece of terminal data 19*a*, these two pieces of terminal data 19*a* being adjacent to each other in the order of detection, is empirically considered to be about five times larger than the data generation time interval at most. Therefore, when the difference between the terminal time data of one piece of terminal data 19a and the terminal time data of another piece of terminal data 19a, these two pieces of terminal data 19a being adjacent to each other in the order of detection, is ten times larger than the data generation time interval or more, that is, 50 seconds or more, it is possible for the terminal data correction unit 35 to determine that the reception of the terminal data 19a by the data transmission/reception unit 30 has been temporarily interrupted. The time period of 50 seconds, which is a criterion at this time, is one specific example of the first value.

S340:

The terminal data correction unit 35 divides the plurality of pieces of terminal data 19a into j groups at a point of interruption. In the example shown in FIG. 8, the plurality of pieces of terminal data 19a are temporarily interrupted between the terminal data No. 14795 and the terminal data No. 14796 and there are no other interruptions. Therefore, the terminal data correction unit 35 divides the plurality of pieces of terminal data 19a into two groups at the point of interruption. That is, the terminal data 19a from the terminal data No. 14772 to the terminal data No. 14795 belong to the group that comes first in the order of the detection and the terminal data 19a from the terminal data No. 14796 to the terminal data No. 14802 belong to the group that comes later in the order of the detection.

FIG. 9 only shows some of the plurality of pieces of terminal data 19a that belong to the group that comes first in the order of the detection.

S350 and S360:

Referring once again to FIG. 7, the terminal data correction unit 35 executes the processing of S350 and S360 separately for each step.

S350:

The terminal data correction unit 35 gives detection order data that is increased or decreased by a predetermined increase/decrease value in the order of the detection to the plurality of pieces of terminal data 19a. In this example embodiment, the terminal data correction unit 35 gives detection order data that is increased by one in the order of the detection to the plurality of pieces of terminal data 19a. Therefore, as shown in FIG. 9, in this example embodiment, the detection order data is a natural number. Alternatively, however, the predetermined increase/decrease value may be 0.35 or −0.27. As shown in FIG. 9, the detection order data (1 to 14) that is increased by one in the order of the detection is given to the terminal data 19a from the terminal data No. 14772 to the terminal data No. 14785. Likewise, the detection order data (16 to 24) that is increased by one in the order of the detection is given to the terminal data 19a from the terminal data No. 14787 to the terminal data No. 14795.

Further, the terminal data correction unit 35 gives detection order data that is increased or decreased by a predetermined increase/decrease value in the order of the detection to the plurality of pieces of terminal data 19a in view of the missing. Specifically, when the difference between the terminal time data of one piece of terminal data 19a and the terminal time data of another piece of terminal data 19a, these two pieces of terminal data 19a being adjacent to each other in the order of detection, is longer than the data generation time interval but shorter than 50 seconds, the terminal data correction unit 35 sets, as the detection order data to be added to the terminal data 19a that comes later in the order of the detection, a value obtained by adding a value obtained by multiplying a value obtained by dividing this difference by the data generation time interval by a predetermined increase/decrease value to the detection order data to be added to the terminal data 19a that comes first in the order of the detection. In this example embodiment, the above 50 seconds is one specific example of the second value. The ground for the above 50 seconds is as follows. That is, the number of times that the data transmission/reception unit 20 fails to receive the terminal data 19a in succession is empirically less than 10 times at most, and the above 50 seconds correspond to a value obtained by multiplying the data generation time interval by 10.

A description will be given using the example shown in FIG. 9. As two pieces of terminal data 19a that are adjacent to each other in the order of detection, the difference between the terminal time data of the terminal data 19a of the terminal data No. 14785 and the terminal time data of the terminal data 19a of the terminal data No. 14787 is 10.000 seconds, which is longer than 5 seconds and is shorter than 50 seconds. Therefore, the terminal data correction unit 35 determines that there has been terminal data 19a that has not been received between the terminal data 19a of the terminal data No. 14785 and the terminal data 19a of the terminal data No. 14787, that is, that there has been a reception loss (missing) of the terminal data 19a. Then, the terminal data correction unit 35 sets, as the detection order data to be added to the terminal data 19a of the terminal data No. 14787 that comes later in the order of the detection, to be "16", which is a value obtained by adding "2", which is a value obtained by multiplying a value obtained by dividing 10.000 seconds, which is the difference, by five seconds, by "1", which is a predetermined increase/decrease value to "14", which is the detection order data to be added to the terminal data 19a that comes first in the order of the detection.

Note that, in this example embodiment, when each of the wearable terminals 3 generates terminal data 19a, the terminal data No. incremented in the order of the detection is included in the terminal data 19a. Therefore, the terminal data No. itself may be used as the detection order data.

Figure 10:
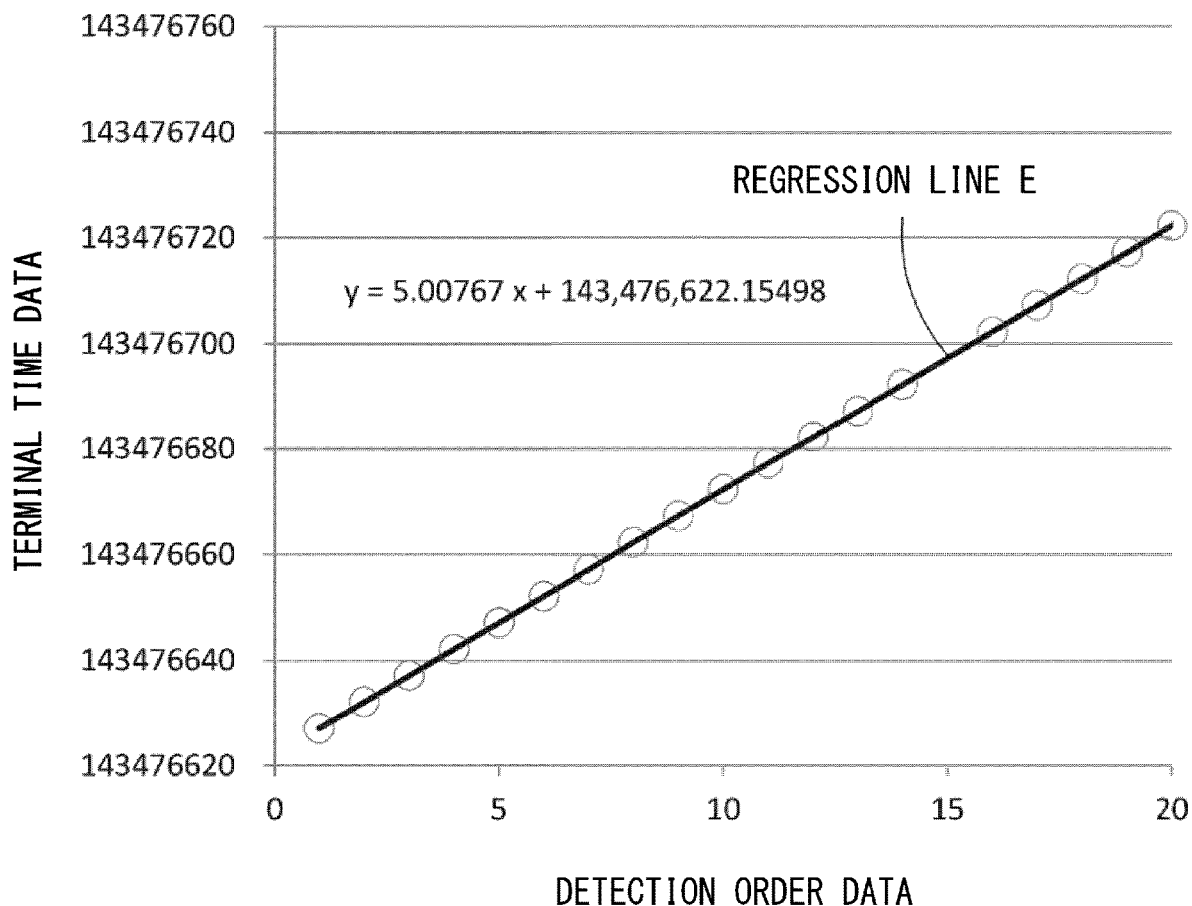
FIG. 10 is a graph showing a regression line of detection order data and terminal time data.

S360:

Next, the terminal data correction unit 35 obtains a regression line (linear regression equation) between the terminal time data and the detection order data and changes the terminal time data to a value obtained by substituting the detection order data into the linear regression equation. Referring is now made to FIG. 10, which shows a graph in which the plurality of pieces of terminal data 19a shown in FIG. 9 are plotted. The horizontal axis of the graph shown in FIG. 10 indicates the detection order data and the vertical axis indicates the terminal time data. FIG. 10 shows a regression line E calculated by the terminal data correction unit 35. In this example embodiment, the regression line E is indicated by a linear regression equation: y=5.00767 x+143476622.15498. In some embodiments, the regression line E is obtained based on, for example, the least-squares method.

Figure 11:
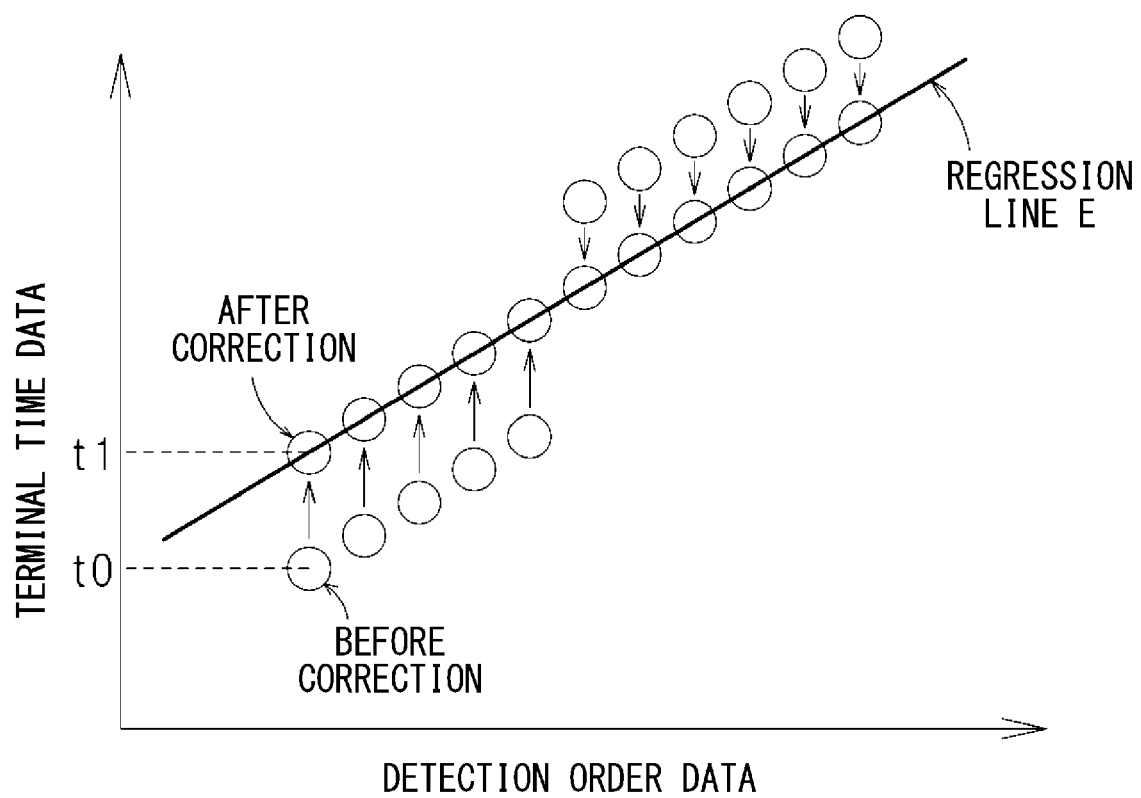
FIG. 11 is a graph for describing correction of the terminal time data.

Referring is now made to FIG. 11, which shows an enlarged view of a part of the graph shown in FIG. 10. As shown in FIG. 11, the terminal data correction unit 35 changes, for each terminal data 19a, terminal time data t0 to a value t1 obtained by substituting the corresponding detection order data into x of the linear regression equation of the regression line E. In short, by moving the plot of the terminal data 19a parallel to the vertical axis and superimposing it on the regression line E, the terminal time data of the terminal data 19a is corrected. FIG. 9 shows the terminal time data after correction of the plurality of pieces of terminal data 19a and a difference between the terminal time data after correction of one piece of terminal data and the terminal data after correction of another piece of terminal data, these two pieces of terminal data being adjacent to each other in the order of the detection. As shown in FIGS. 9 and 11, according to the above correction, intervals between the terminal time data of the plurality of pieces of terminal data 19*a* become even on the time axis. The technical significance of the correction is as follows.

That is, a communication delay inevitably occurs when the terminal time data is corrected by the terminal time correction unit 16 and the amount of communication delay does not become constant and inevitably fluctuates every time.

In the example shown in FIG. 8, the correction of the terminal time data by the terminal time correction unit 16 is executed between the time when the terminal data 19*a* of the terminal data No. 14778 is generated and the time when the terminal data 19*a* of the terminal data No. 14779 is generated. It is estimated that the amount of the communication delay at this time is longer than the previous amount of delay by 0.17 seconds. Likewise, the correction of the terminal time data by the terminal time correction unit 16 is executed between the time when the terminal data 19*a* of the terminal data No. 14791 is generated and the time when the terminal data 19*a* of the terminal data No. 14792 is generated. It is estimated that the amount of the communication delay at this time is shorter than the previous amount of delay by 0.03 seconds.

As the amount of delay fluctuates every time as described above, the terminal times of the respective plurality of wearable terminals 3 never coincide with each other. However, the aforementioned communication delay can be expressed by a normal distribution and an average value of the amounts of numerous communication delays converges to an average value of the normal distribution. It is considered that the average value of the normal distribution becomes the same value across the plurality of wearable terminals 3.

Therefore, by correcting the terminal time data of the plurality of pieces of terminal data 19*a* using the regression line E in such a way that the intervals between the terminal time data of the plurality of pieces of terminal data 19*a* become even on the time axis, the fluctuation in the amount of the communication delay disappears and the deviation of the terminal time among the plurality of wearable terminals 3 is eliminated. It is therefore possible to analyze the plurality of pieces of terminal data 19*a* received from the plurality of wearable terminals 3 on the same time axis.

It should be noted that the terminal time data after the correction of all the wearable terminals 3 is delayed from the apparatus time data by the amount corresponding to the average value of the amounts of the communication delay (average value of the normal distribution).

S370:

Referring is made once again to FIG. 7. The communication analysis unit 36 analyzes the communication in which the plurality of participants 2 participate based on the plurality of pieces of terminal data 19*a* that have been corrected, and outputs the results of the analysis to, for example, a display.

While example embodiments of the present disclosure have been described above, the above example embodiments include the following features.

As shown in FIG. 1, the communication analysis system 1 (the information processing system) includes the plurality of wearable terminals 3 (the sensor terminals) worn by the plurality of participants 2 who participate in one communication and the analysis apparatus 4 (the information processing apparatus) capable of communicating with the plurality of wearable terminals 3. As shown in FIG. 2, each of the wearable terminals 3 includes the sensor 12 that outputs sensing data regarding the participant 2 wearing the wearable terminal 3, the terminal clock unit 15, the terminal time correction unit 16 that corrects the terminal time of the terminal clock unit 15 based on the time data externally acquired, the oscillation circuit 11, the terminal data generation unit 19 that acquires the sensing data output from the sensor 12 and the terminal time data output from the terminal clock unit 15 at the predetermined data generation time interval (the generation time interval) counted based on the output signal of the oscillation circuit 11, and generates the terminal data 19*a* including the sensing data and the terminal time data, and the data transmission/reception unit 20 (the data transmission unit) that transmits the terminal data 19*a* to the analysis apparatus 4. As shown in FIG. 4, the analysis apparatus 4 includes the terminal data storage unit 31 that stores the plurality of pieces of terminal data 19*a* received from each of the wearable terminals 3, and the terminal data correction unit 35 that corrects, for each of the wearable terminals 3, the terminal time data of the plurality of pieces of terminal data 19*a*. The terminal data correction unit 35 corrects the terminal time data of the plurality of pieces of terminal data 19*a* in such a way that the intervals between the terminal time data of the plurality of pieces of terminal data 19*a* become even on the time axis. According to the above configuration, the deviation of the terminal time between the plurality of wearable terminals 3, which is due to the communication delay at the time of correction by the terminal time correction unit 16, is eliminated, whereby it becomes possible to analyze the terminal data 19*a* received from the plurality of wearable terminals 3 on the same time axis.

Further, as shown in FIGS. 9 to 11, the terminal data correction unit 35 adds the detection order data that is increased or decreased by a predetermined increase/decrease value in the order of the detection to the plurality of pieces of terminal data 19*a*, obtains a linear regression equation between the terminal time data and the corresponding detection order data, and changes the terminal time data to a value obtained by substituting the corresponding detection order data into a linear regression equation.

Further, as shown in FIG. 8, when the difference between the terminal time data of one piece of terminal data 19*a* and the terminal time data of another piece of terminal data 19*a*, these two pieces of terminal data 19*a* being adjacent to each other in the order of detection, is equal to or larger than a first value, the terminal data correction unit 35 divides the plurality of pieces of terminal data 19*a* into two groups at a border between the two pieces of terminal data 19*a* and corrects, for each group, the terminal time data of the plurality of pieces of terminal data 19*a*. That is, when the wearable terminal 3 has temporarily stopped transmission of the terminal data 19*a*, the difference between the terminal time data of one piece of terminal data 19*a* and the terminal time data of another piece of terminal data 19*a*, these two pieces of terminal data 19*a* being those before and after the stop, becomes large, which ends up being noise for the above linear regression equation. In order to deal with this problem, according to the above configuration, the plurality of pieces of terminal data 19*a* are divided into groups before and after the stop and the correction is executed for each group, whereby it becomes possible to eliminate the influence of the above noise.

Further, when the difference between the terminal time data of one piece of terminal data 19*a* and the terminal time data of another piece of terminal data 19a, these two pieces of terminal data 19a being adjacent to each other in the order of detection, is longer than the data generation time interval but equal to or smaller than the second value, the terminal data correction unit 35 sets, as the detection order data to be added to the terminal data 19a that comes later in the order of the detection, a value obtained by adding a value obtained by multiplying a value obtained by dividing the difference by the generation time interval by a predetermined increase/decrease value to the detection order data to be added to the terminal data 19a that comes first in the order of the detection. That is, when one of the plurality of pieces of terminal data 19a is missing, the difference between the terminal time data of one piece of terminal data 19a and the terminal time data of another piece of terminal data 19a, these two pieces of terminal data 19a being those before and after the missing terminal data 19a, becomes larger than the difference between the terminal time data of one piece of terminal data 19a and the terminal time data of another piece of terminal data 19a, which are terminal data 19a prior to the missing. When, for example, a piece of terminal data 19a is missing, the difference between the terminal time data of one piece of terminal data 19a and the terminal time data of another piece of terminal data 19a, these two pieces of terminal data 19a being those before and after the missing terminal data 19a, becomes twice as large as the generation time interval. Therefore, according to the above configuration, the regression coefficient of the linear regression equation do not change due to the above missing.

If the plurality of pieces of terminal data 19a are divided into groups and correction processing is performed every time the reception of the terminal data 19a ends in failure, the difference in the terminal time data of the terminal data 19a after the correction is not likely to converge to the data generation time interval, the deviation of the terminal time between the plurality of wearable terminals 3, which is due to the communication delay at the time of correction by the terminal time correction unit 16, is not completely eliminated. In this sense as well, by preventing the plurality of pieces of terminal data 19a from being divided into groups every time the reception of the terminal data 19a ends in failure, it becomes possible to eliminate the deviation of the terminal time between the plurality of wearable terminals 3 at a high level.

In the aforementioned examples, a (the) program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An information processing method of an information processing system comprising a plurality of sensor terminals worn by a plurality of respective participants who participate in one communication and an information processing apparatus capable of communicating with the plurality of sensor terminals, wherein each of the sensor terminals comprises:
   a sensor configured to output sensing data regarding a participant who wears the sensor terminal;
   a terminal clock unit; and
   an oscillation circuit,
each of the sensor terminals corrects a terminal time of the terminal clock unit based on time data externally acquired,
each of the sensor terminals acquires the sensing data output from the sensor and terminal time data output from the terminal clock unit at a predetermined generation time interval counted based on an output signal of the oscillation circuit, and generates terminal data including the sensing data and the terminal time data,
each of the sensor terminals transmits the terminal data to the information processing apparatus,
the information processing apparatus stores a plurality of pieces of terminal data received from each of the sensor terminals,
the information processing apparatus corrects, for each of the sensor terminals, the terminal time data of the plurality of pieces of terminal data,
correcting the terminal time data of the plurality of pieces of terminal data comprises correcting the terminal time data of the plurality of pieces of terminal data in such a way that the intervals between the terminal time data of the plurality of pieces of terminal data become even on the time axis,
adding detection order data that is increased or decreased by a predetermined increase/decrease value in an order of a detection to the plurality of pieces of terminal data;
obtaining a linear regression equation between the terminal time data and the corresponding detection order data;
changing the terminal time data to a value obtained by substituting the corresponding detection order data into the linear regression equation; and
setting, when a difference between the terminal time data of one piece of terminal data and the terminal time data of a second piece of terminal data is longer than the generation time interval and is equal to or smaller than a second value and the first and the second pieces of terminal data being adjacent to each other in the order of detection, a third value as the detection order data to be added to the terminal data that comes later in the order of the detection, the third value obtained by dividing the difference by the generation time interval to yield a fourth value, multiplying the fourth value by the predetermined increase/decrease value to derive a fifth value, and adding a sixth value as the detection order data to be added to the terminal data that comes first in the order of detection.

2. The information processing method according to claim 1, wherein
correcting the terminal time data of the plurality of pieces of terminal data comprises:

dividing, when the difference between the terminal time data of the one piece of terminal data and the terminal time data of the second piece of terminal data and the first and the second pieces of terminal data being adjacent to each other in the order of detection, is equal to or larger than a seventh value, the plurality of pieces of terminal data into two groups at a border between the first and the second pieces of terminal data; and correcting, for each of the groups, the terminal time data of the plurality of pieces of terminal data.

3. A non-transitory computer readable medium storing a program for causing a computer to execute the information processing method according to claim 1.

4. An information processing system comprising a plurality of sensor terminals worn by a plurality of respective participants who participate in one communication and an information processing apparatus capable of communicating with the plurality of sensor terminals, wherein each of the sensor terminals comprises:
- a sensor configured to output sensing data regarding a participant who wears the sensor terminal;
- a terminal clock unit;
- a terminal time correction unit configured to correct a terminal time of the terminal clock unit based on time data externally acquired;
- an oscillation circuit;
- a terminal data generation unit configured to acquire the sensing data output from the sensor and terminal time data output from the terminal clock unit at a predetermined generation time interval counted based on an output signal of the oscillation circuit, and generate terminal data including the sensing data and the terminal time data; and
- a data transmission unit configured to transmit the terminal data to the information processing apparatus, the information processing apparatus comprises:
- a terminal data storage unit configured to store a plurality of pieces of terminal data received from each of the sensor terminals; and
- a terminal data correction unit configured to correct, for each sensor terminal, the terminal time data of the plurality of pieces of terminal data, and the terminal data correction unit corrects the terminal time data of the plurality of pieces of terminal data in such a way that the intervals between the terminal time data of the plurality of pieces of terminal data become even on the time axis, wherein the terminal data correction unit corrects the terminal time data of the plurality of pieces of terminal data by:

adding detection order data that is increased or decreased by a predetermined increase/decrease value in an order of a detection to the plurality of pieces of terminal data;

obtaining a linear regression equation between the terminal time data and the corresponding detection order data;

changing the terminal time data to a value obtained by substituting the corresponding detection order data into the linear regression equation; and setting, when a difference between the terminal time data of one piece of terminal data and the terminal time data of a second piece of terminal data is longer than the generation time interval and is equal to or smaller than a second value and the first and the second pieces of terminal data being adjacent to each other in the order of detection, a third value as the detection order data to be added to the terminal data that comes later in the order of the detection, the third value obtained by dividing the difference by the generation time interval to yield a fourth value, multiplying the fourth value by the predetermined increase/decrease value to derive a fifth value, and adding a sixth value as the detection order data to be added to the terminal data that comes first in the order of detection.

5. The information processing method according to claim 1, wherein the sensor comprises a microphone and an acceleration sensor, the method further comprising:

converting, by the microphone, a sound around at least one sensor terminal into a voltage value that is stored as sound pressure data, and converting, by the acceleration sensor, an acceleration of the at least one sensor terminal into a second voltage value that is stored as acceleration data.

6. The information processing method according to claim 5, wherein the terminal time data corresponds to timing when an earliest sound pressure data included in at least one piece of terminal data has been detected.

7. The information processing system according to claim 4, wherein the sensor comprises a microphone that is configured to convert a sound around at least one sensor terminal into a voltage value that is stored as sound pressure data, and an acceleration sensor that is configured to convert an acceleration of the at least one sensor terminal into a second voltage value that is stored as acceleration data.

8. The information processing system according to claim 7, wherein the terminal time data corresponds to timing when an earliest sound pressure data included in at least one piece of terminal data has been detected.

* * * * *